C. A. BELEW.
PNEUMATIC TIRE PROTECTOR.
APPLICATION FILED JAN. 8, 1912.
1,027,800.
Patented May 28, 1912.
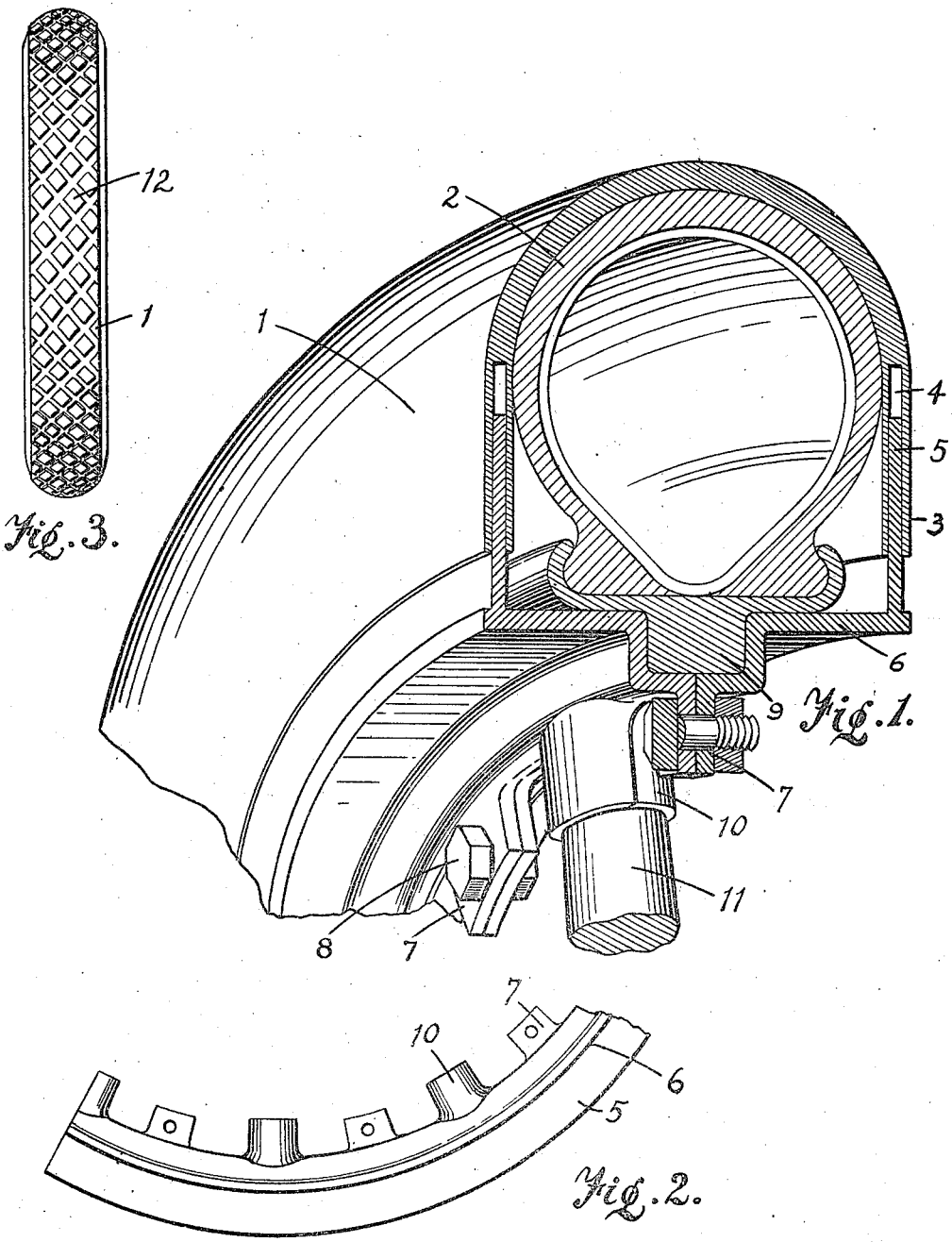

UNITED STATES PATENT OFFICE.

CUBA A. BELEW, OF SAN DIEGO, CALIFORNIA.

PNEUMATIC-TIRE PROTECTOR.

1,027,800.

Specification of Letters Patent. Patented May 28, 1912.

Application filed January 8, 1912. Serial No. 670,053.

*To all whom it may concern:*

Be it known that I, CUBA A. BELEW, a citizen of the United States, residing at San Diego, in the county of San Diego and State of California, have invented a new and Improved Pneumatic-Tire Protector, of which the following is a description.

This invention relates to a protector for vehicle tires of the class having a continuous elastic pneumatic inflatable tube, and has for its object the provision of novel details of construction of the character hereinafter indicated, which embodies a continuous steel hoop, adapted to cover the tire tread and to incase the tire, and means for retaining the hoop in position with reference to the wheel rim and the tire.

Another object is the provision of means whereby the vehicle wheel may be run without injury to the tire and the wheel rim, when the air is out of the tube, and therefore provide safety to the vehicle until the tire is again inflated. Also this device produces all the advantages of an elastic vehicle tire, and renders the tire absolutely puncture proof.

My invention consists in the combination and arrangement of parts as hereinafter described and defined in the appended claim, and of which a convenient embodiment is shown in the accompanying drawings which form a part of this specification.

Of the drawings, Figure 1 is a sectional and perspective view of a portion of a wheel and tire with my invention applied thereto, Fig. 2 is a side view of a part of a section of the retaining member, and Fig. 3 is a detail view of a modified form of the tread portion of the protector.

While simple and efficient means are herein provided for accomplishing the objects of the invention and the elements shown and described are well adapted to serve the purposes for which they are intended, it is to be understood that no limitation is necessarily made to the precise structural details exhibited in the drawings, but that changes, alterations, and modifications, which are within the scope of the claim, may be made when desired.

Referring more particularly to the drawings in which similar characters of reference denote corresponding parts of the invention throughout the several views, the steel tread portion 1, of my protector, forms a hoop or band that is curved to conform approximately to the exterior of the rubber shoe 2, of the tire, and flanges 3, on said hoop, are provided with grooves 4, which receive and engage with tongues 5, of the supporting and retaining member 6. Member 6 is made in corresponding sections which are provided with ears 7, pierced for bolts 8, which clamp the corresponding sections together. Member 6 is adapted to fit wheel-rim 9, closely, and has extensions 10, which incase the outer ends of the spokes 11, causing the retaining member to be held in a rigid position.

In Fig. 3, a modified form of the tread portion of the hoop, is shown, having projections 12, embossed thereon to prevent side skidding of the vehicle. Member 6 is made in sections whereby the same may be the more readily applied to the wheel rim, each corresponding half being divided into three or four sections so that tongues 5 may be inserted in grooves 4, of member 1. A pair of ears 7, is provided on member 6, between each pair of adjacent spokes of the wheel and clamping bolts 8, extend transversely of the wheel rim.

It will be seen that when the tire is inflated, member 1, of the protector, is so held that a space is maintained in the bottom of grooves 4, of flanges 3, thus securing the advantages of the elasticity of the tire, and retaining member 6, is utilized to resist only the side thrust of member 1. It will also be seen that when the tire has become sufficiently deflated, member 1 will, at the bottom or pressure side, rise and form a contact with member 6, and a constant metallic tire is thus formed for the vehicle wheel, the rubber tire being thus protected from rim cutting and from further injury which is liable to occur when a tire is partially inflated.

All parts of my device may be formed from sheet steel and therefore be produced at a low cost of manufacture. The same being of steel is also adapted to resist wear and protect the tire from puncture.

From the foregoing it will be seen that I have provided a device, which thoroughly protects and covers the tire of a vehicle wheel, the essence of my invention comprising the tread member 1, of a continuous hoop of steel, retaining members 6, which hold the tread member in position when the tire is insufficiently inflated, and means for clamping the retaining member to a vehicle wheel, the invention being such that a nail or other pointed object cannot penetrate the tire and the tire cannot become injured by becoming deflated, and also, the rubber tire which is an expensive part of a vehicle equipment, may be made thinner, and therefore may be produced at a cheaper cost, and such tire will be more elastic and of greater resiliency than may be found in the present forms of construction.

I claim as my invention:

In a pneumatic tire protector, a tread member conforming to the exterior of the tire shoe, flanges on said member extending inwardly and having grooves therein, a retaining member adapted to be clamped to the wheel rim, tongues on said retaining member engaging with said grooves, extensions on said retaining member which incase the outer ends of the wheel spokes and assist in maintaining the rigid position of the retaining member, ears on said retaining member, and bolts passing through said ears for clamping the retaining member to the wheel, substantially as set forth.

Witness my signature to the foregoing specification this 30th day of December, 1911.

CUBA A. BELEW.

Witnesses:
J. W. MASTER,
F. M. KEENEY.